(12) United States Patent
Kamada et al.

(10) Patent No.: US 9,803,562 B2
(45) Date of Patent: Oct. 31, 2017

(54) CONTROL DEVICE AND CONTROL METHOD FOR INTERNAL COMBUSTION ENGINE

(71) Applicant: NISSAN MOTOR CO., LTD., Yokohama-shi, Kanagawa (JP)

(72) Inventors: Shinobu Kamada, Yokohama (JP); Taisuke Ikari, Hiratsuka (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/397,530

(22) PCT Filed: Apr. 10, 2013

(86) PCT No.: PCT/JP2013/060842
§ 371 (c)(1),
(2) Date: Oct. 28, 2014

(87) PCT Pub. No.: WO2013/172130
PCT Pub. Date: Nov. 21, 2013

(65) Prior Publication Data
US 2015/0122226 A1 May 7, 2015

(30) Foreign Application Priority Data

May 17, 2012 (JP) .................. 2012-112929

(51) Int. Cl.
F02B 75/04 (2006.01)
F02D 15/04 (2006.01)
F02D 13/02 (2006.01)
F02D 15/02 (2006.01)
(Continued)

(52) U.S. Cl.
CPC ............. *F02D 15/04* (2013.01); *F02D 13/02* (2013.01); *F02D 13/0261* (2013.01); *F02D 15/02* (2013.01); *F02D 41/0002* (2013.01); *F02D 41/10* (2013.01); *F02B 75/048* (2013.01); *F02D 41/006* (2013.01); *F02D 2041/001* (2013.01); *Y02T 10/18* (2013.01); *Y02T 10/42* (2013.01)

(58) Field of Classification Search
USPC .................................. 123/78 R, 48 R, 48 B
See application file for complete search history.

(56) References Cited

U.S. PATENT DOCUMENTS

| 5,996,550 A | 12/1999 | Israel et al. |
| 6,769,404 B2 | 8/2004 | Aoyama et al. |
| 7,278,383 B2 | 10/2007 | Kamiyama et al. |

(Continued)

FOREIGN PATENT DOCUMENTS

| EP | 1 293 659 A2 | 3/2003 |
| EP | 1 701 021 A1 | 9/2006 |

(Continued)

*Primary Examiner* — Carlos A Rivera
*Assistant Examiner* — Ruben Picon-Feliciano
(74) *Attorney, Agent, or Firm* — Drinker Biddle & Reath LLP

(57) ABSTRACT

At the time of increasing an actual intake air amount by increasing a valve overlap period of intake and exhaust valves (2; 3), an actual compression ratio is temporarily decreased to be lower than a steady-state target compression ratio. This makes it possible to increase the valve overlap period without causing interference of the intake and exhaust valves (2; 3) with a piston (8).

8 Claims, 9 Drawing Sheets

(51) Int. Cl.
*F02D 41/00* (2006.01)
*F02D 41/10* (2006.01)

(56) References Cited

U.S. PATENT DOCUMENTS

| | | | |
|---|---|---|---|
| 2002/0092488 | A1 | 7/2002 | Aoyama et al. |
| 2004/0112310 | A1* | 6/2004 | Osamura ............... F02B 75/048 123/48 B |
| 2007/0095313 | A1 | 5/2007 | Kamiyama et al. |
| 2009/0178632 | A1* | 7/2009 | Akihisa ............... F01L 13/0063 123/90.15 |
| 2009/0228187 | A1* | 9/2009 | Nakamura ............... F01L 1/022 701/103 |
| 2011/0126519 | A1* | 6/2011 | Okada ................ F02D 13/0246 60/276 |
| 2011/0290217 | A1* | 12/2011 | Kimura .................. F02D 15/04 123/48 C |
| 2012/0017876 | A1* | 1/2012 | Sawada .................. F01L 1/344 123/48 C |

FOREIGN PATENT DOCUMENTS

| | | |
|---|---|---|
| JP | 2001-263099 A | 9/2001 |
| JP | 2002-285876 A | 10/2002 |
| JP | 2004-218551 A | 8/2004 |
| JP | 2007-120464 A | 5/2007 |
| JP | 2008-274963 A | 11/2008 |
| WO | WO 2007/145020 A1 | 12/2007 |

* cited by examiner (A)  (B)

CONTROL DEVICE AND CONTROL METHOD FOR INTERNAL COMBUSTION ENGINE

FIELD OF THE INVENTION

The present invention relates to a control device and method for an internal combustion engine, having a variable valve mechanism capable of varying a valve timing and a variable compression ratio mechanism capable of varying a compression ratio by changing a piston top dead center position.

BACKGROUND ART

An internal combustion engine is known, including a variable compression ratio mechanism capable of varying a compression ratio by changing a combustion chamber volume and a variable valve mechanism capable of varying a valve timing of an intake or exhaust valve such that the compression ratio and the valve timing of the intake or exhaust valve can be controlled according to engine operating conditions.

For example, Patent Document 1 discloses a technique of preventing interference between an intake valve and a piston in such type of engine by determining a maximum compression ratio at which the piston does not interfere with the intake valve at a valve timing set according to engine operating conditions and, when a target compression ratio is higher than the maximum compression ratio, controlling the target compression ratio to the maximum compression ratio.

It is however not possible in the technique of Patent Document 1 to, at the time of increasing an actual intake air amount in response to increase in demand load under the condition that the target compression ratio is high, increase the actual intake air amount by increasing a valve overlap period of the intake and exhaust valves and thereby enhancing cylinder scavenging.

In other words, there is a possibility of interference between the intake valve and the piston in the case where the valve timing of the intake valve is varied so as to increase the valve overlap period of the intake and exhaust valves for the purpose of increasing the actual intake air amount under the condition that the target compression ratio is high.

Prior Art Documents

Patent Document

Patent Document 1: Japanese Laid-Open Patent Publication No. 2007-120464

SUMMARY OF THE INVENTION

In view of the foregoing, the present invention provides a control device for an internal combustion engine, wherein the control device is adapted to decrease an actual compression ratio to be lower than a steady-state target compression ratio at the time when an actual intake air amount should be increased by increasing a valve overlap period of intake and exhaust valves and enhancing cylinder scavenging.

It is possible according to the present invention to, at the time when the actual intake air amount should be increased by increasing the valve overlap period of the intake and exhaust valves and enhancing cylinder scavenging, properly increase the actual intake air amount by increasing the valve overlap period without causing interference between the piston and the intake and exhaust valves.

DESCRIPTION OF EMBODIMENTS

Hereinafter, one embodiment of the present invention will be described below in detail with reference to the drawings.

Figure 1:
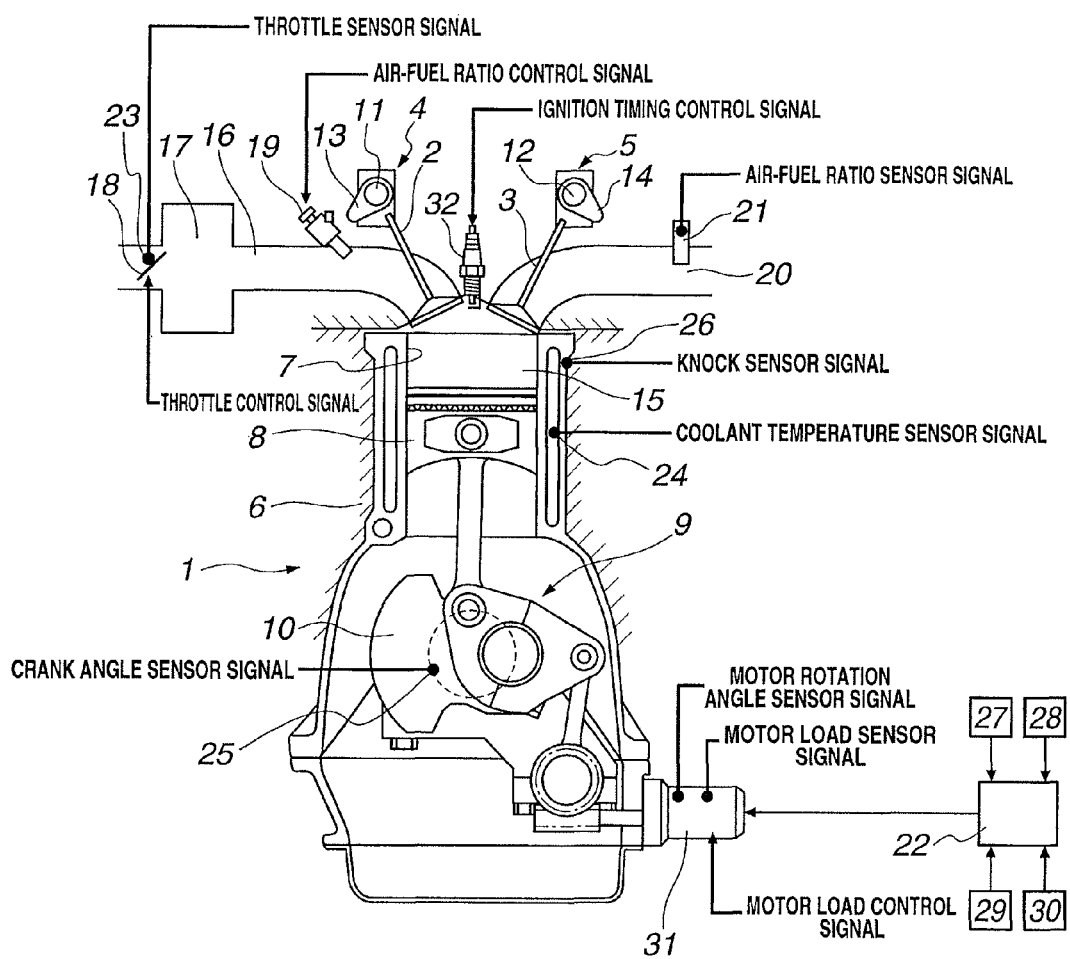
FIG. 1 is a schematic system diagram of a control device for an internal combustion engine according to one embodiment of the present invention.

The basic structure of internal combustion engine 1 to which the present invention is applicable will be first explained with reference to FIG. 1. Internal combustion engine 1 is mounted as a drive source on an automotive vehicle and includes intake- and exhaust-side variable valve mechanisms 4 and 5 capable of varying actual valve timings of intake and exhaust valves 2 and 3, respectively, and variable compression ratio mechanism 9 capable of varying an actual engine compression ratio by changing a top dead center position of piston 8 reciprocating in cylinder 7 of cylinder block 6.

Each of intake- and exhaust-side variable valve mechanisms 4 and 5 is in the form of a known valve timing control (VTC) mechanism that varies the valve timing by changing the phases of camshaft 11, 12 relative to crank shaft 10 as disclosed in e.g. Japanese Laid-Open Patent Publication No. 2002-285876. Intake-side variable valve mechanism 4 is held on one end of intake camshaft 11 with intake cam 13 so as to change a conversion angle, i.e. a phase angle of intake camshaft 11 relative to crank shaft 10 and thereby vary and control an opening/closing timing of intake valve 2, whereas exhaust-side variable valve mechanism 5 is held on one end of exhaust camshaft 12 with exhaust cam 14 so as to change a conversion angle, i.e. a phase angle of exhaust camshaft 12 relative to crank shaft 10 and thereby vary and control an opening/closing timing of exhaust valve 3. It is herein noted that various known types of variable valve mechanisms can be used in the present embodiment.

Intake passage 16 is connected to combustion chamber 15 via intake valve 2. Throttle valve 18 is arranged in intake passage 16 so as to open or close an upstream side of intake collector 17 and adjust an intake air amount. Fuel injection valve 19 is arranged on a downstream side of intake collector 17 in intake passage 16 so as to inject fuel.

Exhaust passage 20 is connected to combustion chamber 15 via exhaust valve 3. Air-fuel ratio sensor 21 is arranged in exhaust passage 20 so as to detect an exhaust air-fuel ratio.

Engine controller module (ECM) 22 is in the form of a known digital computer equipped with a CPU, a ROM, a RAM and an input/output interface. To ECM 22 are inputted various signals such as an air-fuel ratio sensor signal from air-fuel ratio sensor 21, a throttle sensor signal from throttle sensor 23 for detection of the opening of throttle valve, a coolant temperature sensor signal from coolant temperature sensor 24 for detection of coolant temperature, a crank angle sensor signal from crank angle sensor 25 for detection of engine rotation speed, a knock sensor signal from knock sensor 25 for detection of the occurrence or non-occurrence of knocking, an accelerator opening sensor signal from accelerator opening sensor 27 for detection of accelerator pedal depression corresponding to engine load (i.e. load according to driver's demand), a signal from air flow meter 28 for detection of intake air amount, a signal from intake cam angle sensor 29 for detection of the phase of intake camshaft 11 in intake-side variable valve mechanism 4, a signal from exhaust cam angle sensor 30 for detection of the phase of exhaust camshaft 12 in exhaust-side variable valve mechanism 5 and a motor rotation angle sensor from electric motor 31 for drive control of variable compression ratio mechanism 9. Based on these input signals, ECM 22 outputs control signals to fuel injection valve 19, ignition plug 32 for ignition of air-fuel mixture in combustion chamber 15, throttle valve 18, intake- and exhaust-side variable valve mechanisms 4 and 5 and variable compression ratio mechanism 9 and performs comprehensive control of the fuel injection amount, the fuel injection timing, the ignition timing, the throttle valve opening, the lift center angle phases of intake and exhaust valves 2 and 3 and the engine compression ratio.

Figure 2:
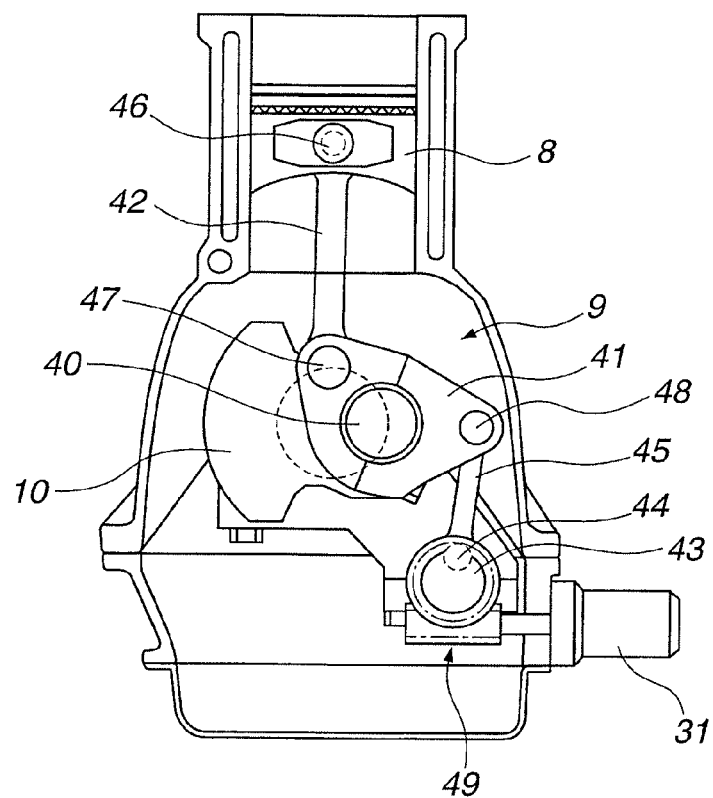
FIG. 2 is a schematic view of a variable compression ratio mechanism used in the control device for the internal combustion engine according to the one embodiment of the present invention.
Figure 3:
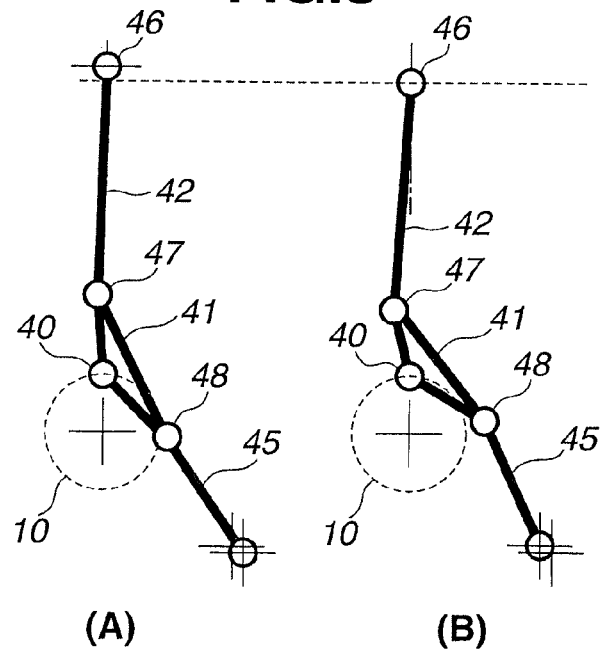
FIGS. 3(A) and (B) are schematic views showing link attitudes of the variable compression ratio mechanism at a high compression ratio position and a low compression ratio position, respectively.

As shown in FIGS. 2 and 3, variable compression ratio mechanism 9 is in the form of a multiple-link type piston-crank mechanism that linkes linking piston 8 to crank pin 40 of crank shaft 10 by a plurality of links. In the present embodiment, variable valve compression ratio mechanism 9 has lower link 41 rotatably mounted on crank pin 40, upper link 42 connecting lower link 41 to piston 8, control shaft 43 equipped with eccentric shaft part 44 and control link 45 connecting eccentric shaft part 44 to lower link 41. Upper link 42 is rotatably fixed at one end thereof to piston pin 64 and is rotatably fixed at the other end thereof to lower link 41 by first connection pin 47. Control link 45 is rotatably fixed at one end thereof to lower link 41 by second connection pin 48 and is rotatably fixed at the other end thereof to eccentric shaft part 44.

Control shaft 43 is arranged in parallel with crank shaft 10 and is rotatably supported on cylinder block 6. This control shaft 43 is rotated and driven by electric motor 31 via gear mechanism 49 so as to adjust its rotational position.

When the rotational position of control shaft 43 is adjusted by electric motor 31, the attitude of lower link 41 by control link 45 changes as shown in FIG. 3 so that the engine compression ratio is continuously varied and controlled with change of the piston motion (stroke characteristics) of piston 8, i.e., the top and bottom dead center position of piston 8.

Figure 4:
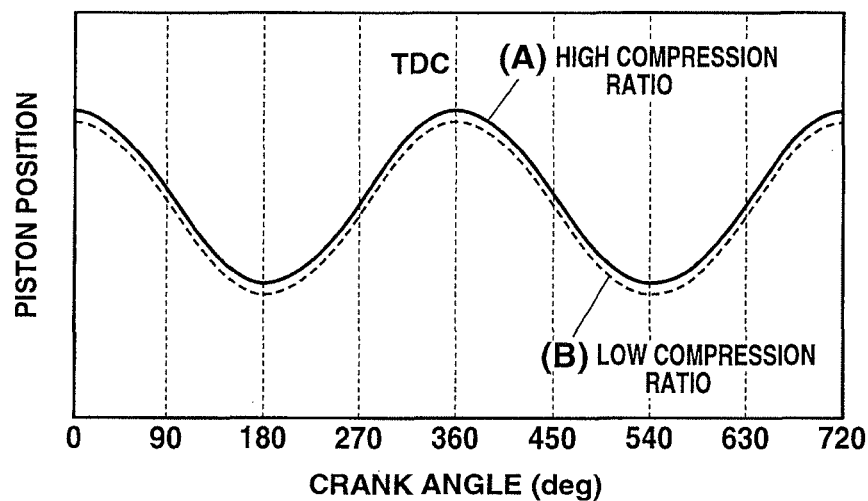
FIG. 4 is a characteristic diagram of a piston motion as controlled by the variable compression ratio mechanism.

The use of such a multiple-link type piston-crank mechanism as variable compression ratio mechanism 9 allows improvements in fuel efficiency and output by optimization of the engine compression ratio according to engine operating conditions and, at the same time, enables realization of the piston stroke characteristics (see FIG. 4) close to e.g. simple harmonic motion as compared to the use of a single-link type mechanism in which a piston and a crank pin are linked by a single link. The use of the multiple-link type piston-crank mechanism also leads to a longer piston stroke relative to the crank throw so as to allow reduction of the total engine height and increase of the engine compression ratio as compared to the single-link type mechanism. Further, the thrust load on piston 8 and cylinder 7 can be reduced for weight reduction of piston 8 and cylinder 7 by optimization of the inclination of upper link 42.

Figure 5:
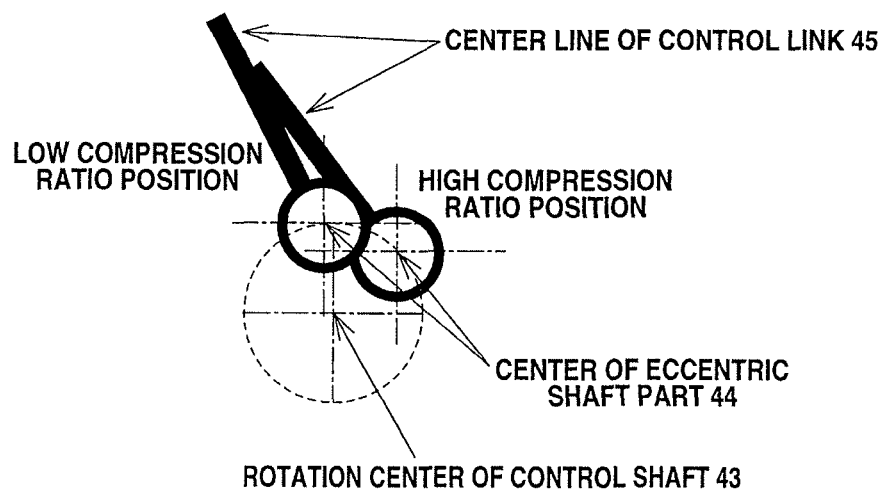
FIG. 5 is a schematic view showing the positional relationship of a control link and a control shaft in the variable compression ratio mechanism at a high compression ratio position and a low compression ratio position.

There is a possibility that knocking transiently occurs when variable compression ratio mechanism 9 delays in changing from a high compression ratio side to a low compression ratio side as shown in FIG. 5. For this reason, the rate of change of the engine compression ratio is set higher on the high compression ratio side than on the low compression ratio side. More specifically, the angle formed between the center line of control link 45 and the eccentric center line connecting the rotation center of control shaft 43 and the center of eccentric shaft part 44 gets closer to a right angle such that the drive moment of electric motor 31 increases with increase in moment arm so as to achieve a higher rate of change of the engine compression ratio at a high compression ratio position as compared to a low compression ratio position.

In this type of internal combustion engine 1, the larger the actual intake air amount (filling efficiency), the lower the steady-state target compression ratio is set. It is herein assumed that the demand load is increased from the state where the actual intake air amount is small. In such a case, the top dead center position of position is high. There is thus a possibility that, at the time of increasing the valve overlap period of intake and exhaust valves 2 and 3 by valve timing control for the purpose of increasing the actual intake air amount in response to increase in the demand load, the valve overlap period cannot be increased due to interference of at least one of intake and exhaust valves 3 with piston 8. It is impossible to increase the actual intake air amount in the case where the valve overlap period cannot be increased in spite of the increase in demand load under the high compression ratio state. This results in continued failure to increase the actual intake air amount as the target compression ratio remains high.

In view of such a problem, the actual compression ratio is temporality decreased to be lower than the steady-state target compression ratio at the time when the actual intake air amount should be increased by increasing the valve overlap period of intake and exhaust valves 2 and 3 in the present embodiment. It is possible by such compression ratio control to assuredly increase the valve overlap period without causing interference of intake and exhaust valves 2 and 3 with piston 8.

Figure 6:
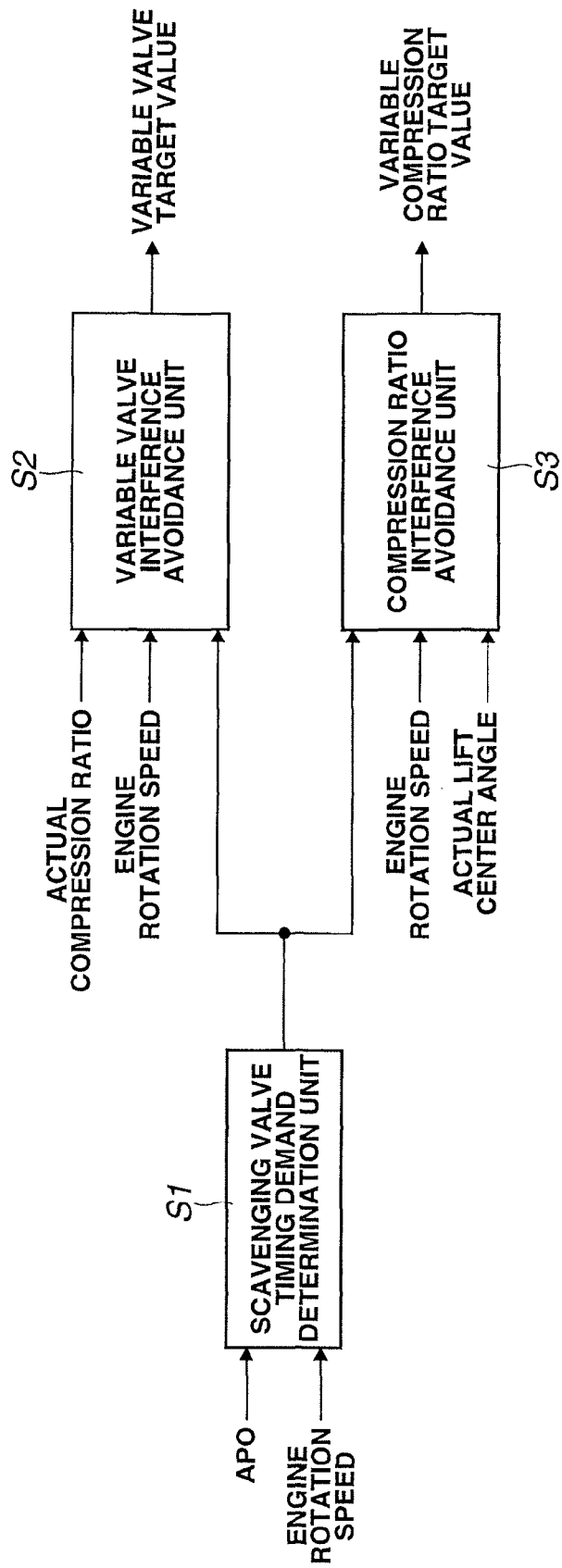
FIG. 6 is a block diagram for control of the control device according to the one embodiment of the present invention.

FIG. 6 is a block diagram of control operation executed by ECU 22 for drive control of intake- and exhaust-side variable valve mechanisms 4 and 6 and variable compression ratio mechanism 9 without causing interference therebetween.

In scavenging valve timing demand determination unit S1, a scavenging valve timing demand value is determined as a scavenging demand value based on the rotation speed of internal combustion engine 1 and the accelerator opening (APO) corresponding to the demand load.

In variable valve interference avoidance unit S2, target lift center angles are set as variable valve target values for intake- and exhaust-side variable valve mechanisms 4 and 5 based on the engine rotation speed, the actual compression ratio and the scavenging valve timing demand value. The actual compression ratio can be determined according to e.g. an output signal from a sensor for detection of the rotational position of control shaft 43 or a control command outputted to electric motor 31 for rotation of control shaft 43 in variable compression ratio mechanism 9.

In compression ratio interference avoidance unit S3, a target compression ratio is set as a variable compression ratio target value for variable compression ratio mechanism 9 based on the engine rotation speed, the actual lift center angles of intake and exhaust valves 2 and 3 and the scavenging valve timing demand value. The actual lift center angles of intake and exhaust valves 2 and 3 can be determined according to the detection values of intake and exhaust cam angle sensors 29 and 30, respectively.

Figure 7:
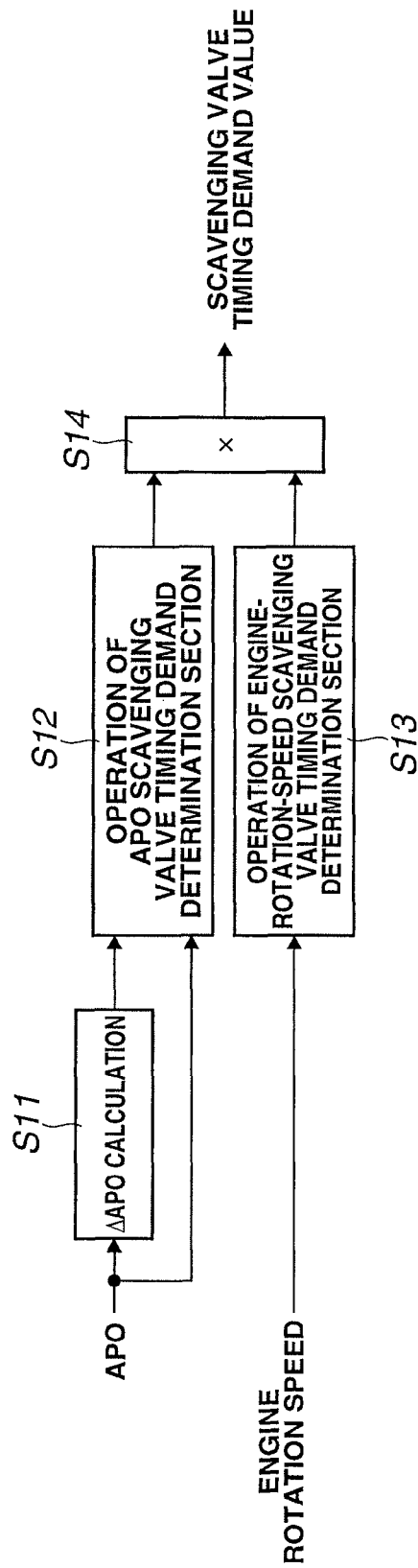
FIG. 7 is a block diagram for determination of a scavenging valve timing demand value according to the one embodiment of the present invention.

The determination of the scavenging valve timing demand value by the scavenging valve timing demand determination unit of FIG. 6 will be explained in detail with reference to FIG. 7.

In section S11, an accelerator opening change rate ΔAPO is calculated from the accelerator opening (APO).

Figure 8:
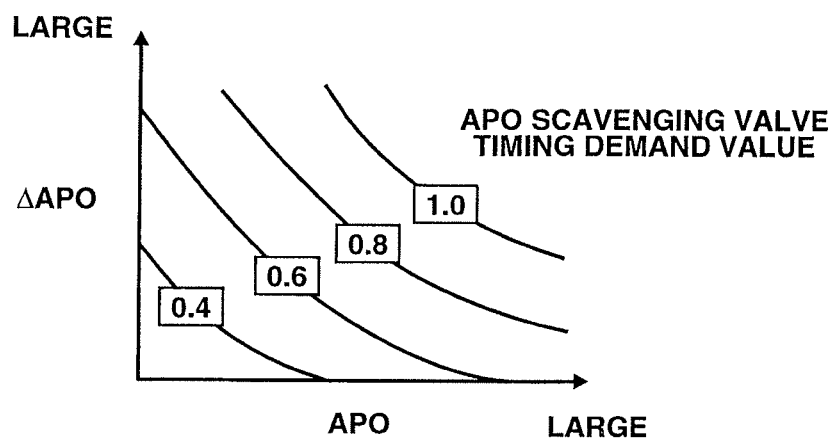
FIG. 8 is a characteristic diagram of an APO scavenging valve timing demand value as determined by the control device according to the one embodiment of the present invention.

In APO scavenging valve timing demand determination section S12, an APO scavenging valve timing demand value is determined based on the accelerator opening APO and the accelerator opening change rate ΔAPO with reference to an APO scavenging valve timing demand value determination map as shown in FIG. 8. In the APO scavenging valve timing demand value determination map, the APO scavenging valve timing demand value is set so as to increase with increase in the accelerator opening change rate ΔAPO and with increase in the accelerator opening APO.

Figure 9:
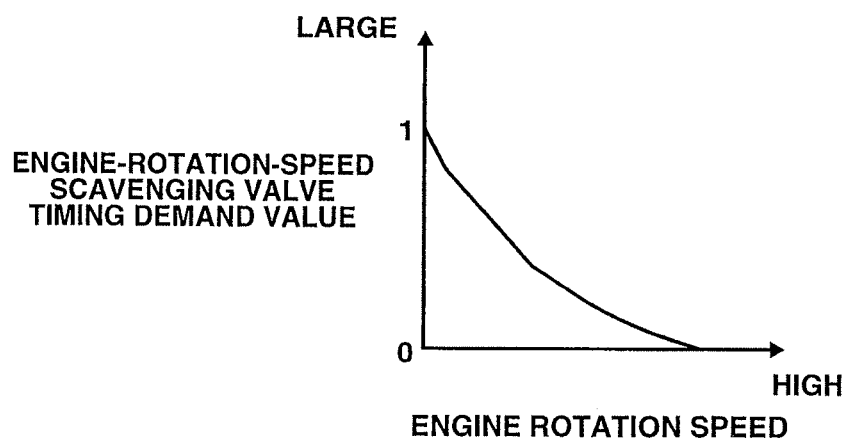
FIG. 9 is a characteristic diagram of an engine-rotation-speed scavenging valve timing demand value as determined by the control device according to the one embodiment of the present invention.

In engine-rotation-speed scavenging valve timing demand determination section S13, an engine-rotation-speed scavenging valve timing demand value is determined based on the engine rotation speed with reference to an engine-rotation-speed scavenging valve timing demand value determination map as shown in FIG. 9. In the engine-rotation scavenging valve timing demand value determination map, the engine-rotation-speed scavenging valve timing demand value is set so as to decrease with increase in the engine rotation speed.

In section S14, the scavenging valve timing demand value is obtained by multiplying the APO scavenging valve timing demand value determined in section S12 by the engine-rotation-speed scavenging valve timing demand value determined in section S13.

Figure 10:
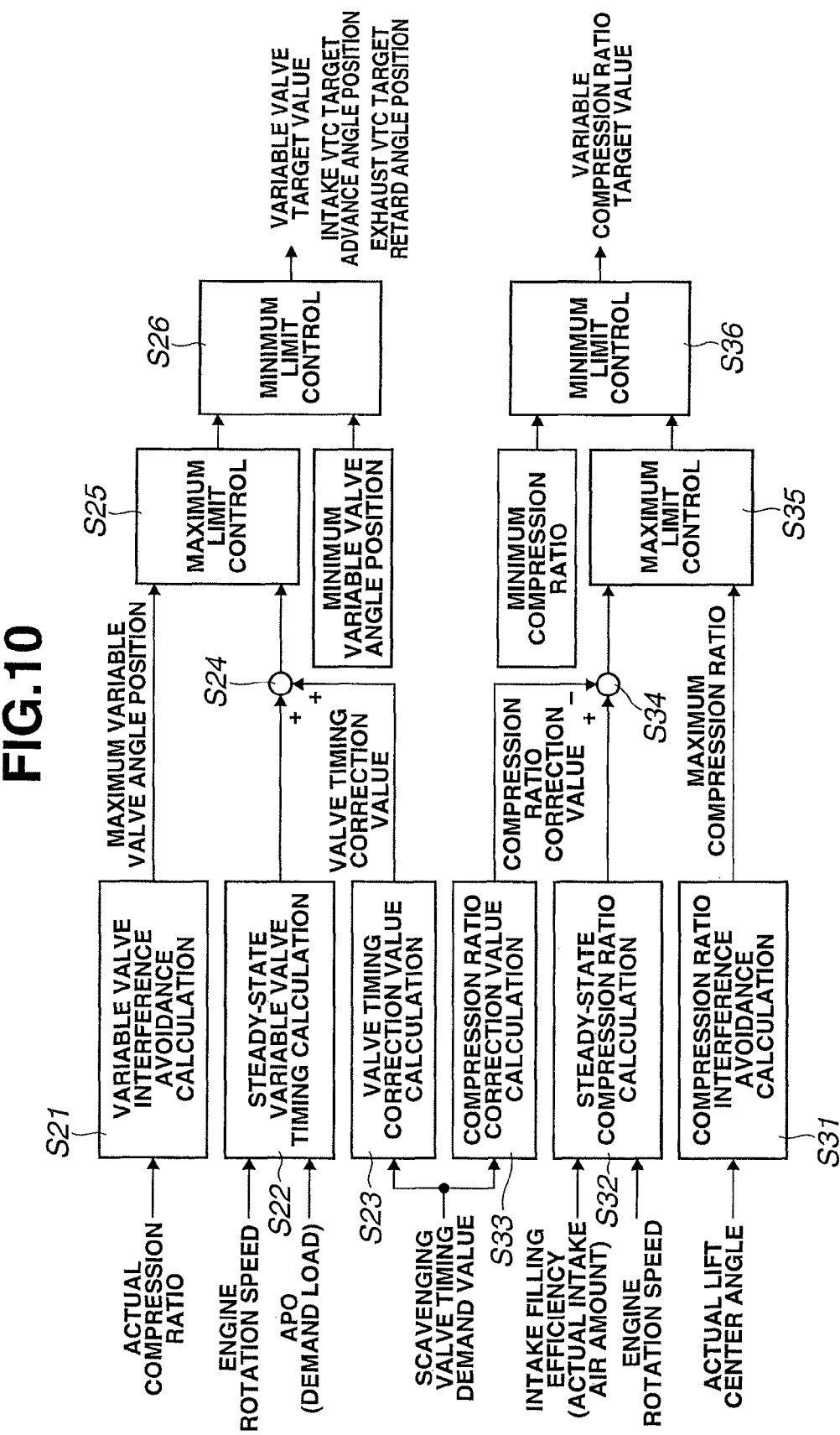
FIG. 10 is a block diagram for setting of a variable valve target value and a variable compression ratio target value as set by the control device according to the one embodiment of the present invention.

Next, the setting of the variable valve target values by the variable valve interference avoidance unit of FIG. 6 and the setting of the variable compression ratio target value by the compression ratio interference avoidance unit of FIG. 6 will be explained in detail with reference to FIG. 10.

Figure 11:
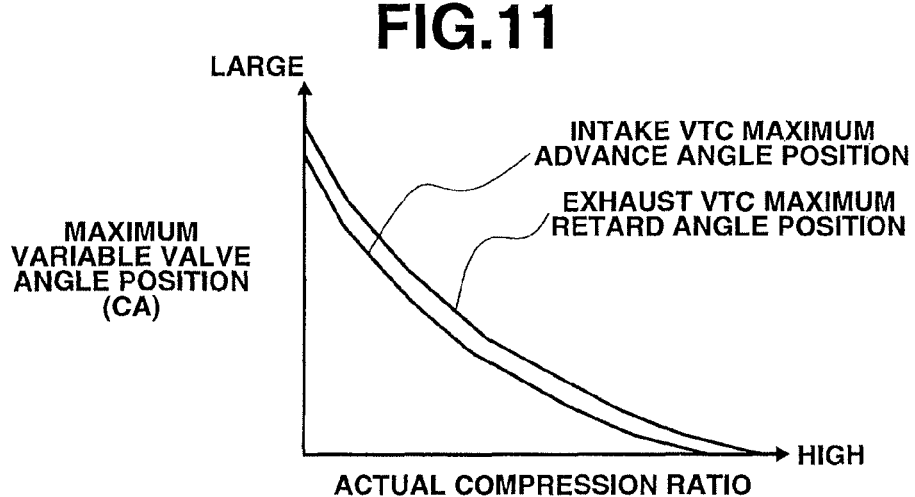
FIG. 11 is a characteristic diagram of a maximum variable valve angle position as calculated by the control device according to the one embodiment of the present invention.
Figure 12:
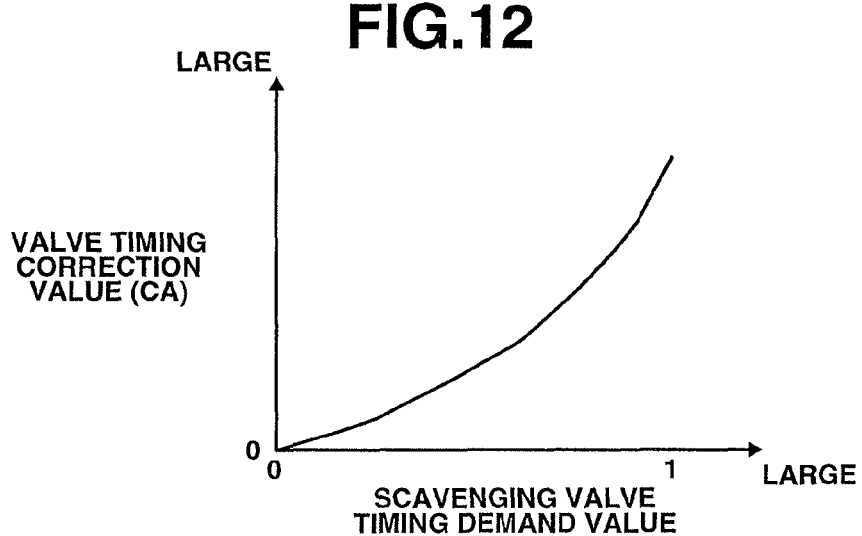
FIG. 12 is a characteristic diagram of a valve timing correction value as calculated by the control device according to the one embodiment of the present invention.

In section S21, variable valve interference avoidance calculation is performed to calculate a maximum advance angle position of the lift center angle of intake valve 2 as an intake VTC maximum advance angle position and a maximum retard angle position of the lift center angle of exhaust valve 3 as an exhaust VTC maximum retard angle position based on the actual compression ratio with reference to a maximum variable valve angle position calculation map as shown in FIG. 11.

The intake VTC maximum advance angle position is the maximum advance angle position of the lift center angle at which intake valve 2 does not interfere with motion of piston 8 in the vicinity of the piston top dead center determined from the actual compression ratio. The intake VTC maximum advance angle position is set to a smaller value as the actual compression ratio becomes higher. The exhaust VTC maximum retard angle position is the maximum retard position of the lift center angle at which exhaust valve 3 does not interfere with motion of piston 8 in the vicinity of the piston top dead center determined from the actual compression ratio. The exhaust VTC maximum retard position is set to a smaller value as the actual compression ratio becomes higher.

In section S22, steady-state variable valve timing calculation is performed to calculate a steady-state control amount (i.e. an amount of advance relative to a most retard angle position) of the lift center angle of intake valve 2 and a steady-state control amount (i.e. an amount of retard relative to a most advance angle position) of the lift center angle of exhaust valve 3 based on the engine rotation speed and the accelerator opening (APO).

In section S23, valve timing correction value calculation is performed to calculate a valve timing correction value based on the scavenging valve timing demand value with reference to a valve timing correction value calculation map as shown in FIG. 11. In the valve timing correction value calculation map, the valve timing correction value is set so as to increase with increase in the scavenging valve timing demand value.

In section S24, the target lift center angle of intake valve 2 is obtained by adding the valve timing correction value calculated in section S23 to the steady-state control amount of the lift center angle of intake valve 2 calculated in section S22; and the target lift center angle of exhaust valve 3 is obtained by adding the valve timing correction value calculated in section S23 to the steady-state control amount of the lift center angle of exhaust valve 3 calculated in section S22.

In the above calculation process, the amount of increase of the valve overlap period becomes larger according to the scavenging valve timing demand value as the valve timing correction value increases with increase in the scavenging valve timing demand value. The actual intake air amount can be thus increased rapidly with increase in the scavenging valve timing demand value.

In section S25, the intake VTC maximum advance angle position calculated in section S21 is compared with the intake-side variable valve target value obtained in section S24 so as to select the smaller one of these parameters as the intake-side variable valve target value; and the exhaust VTC maximum retard angle position calculated in section S21 is compared with the exhaust-side variable target valve value calculated in section S24 so as to select the smaller one of these parameters as the exhaust-side variable valve target value. Namely, maximum limit control is performed in section S25 in such a manner that the target advance angle position of the lift center angle of intake-side variable valve mechanism 4 and the target retard angle position of the lift center angle of exhaust-side variable valve mechanism 5 become smaller than their respective maximum values (control limit values) at which intake and exhaust valves 2 and 3 do not interfere with piston 8 in the vicinity of piston the top dead center.

In section S26, an intake VTC minimum advance angle position, i.e., minimum variable valve angle position is compared with the intake-side variable valve target value obtained in section S25 so as to select the larger one of these parameters as the intake-side variable valve target value; and an exhaust VTC minimum retard angle position, i.e., minimum variable valve angle position is compared with the exhaust-side variable valve target value obtained in section S25 so as to select the larger one of these parameters as the exhaust-side variable valve target value. Namely, minimum limit control is performed to set minimum limits on the target advance angle position of the lift center angle of intake-side variable valve mechanism 4 and the target retard angle position of the lift center angle of exhaust-side variable valve mechanism 5 in section S26. It is herein noted that the minimum variable valve angle positions such as intake VTC minimum advance angle position and exhaust VTC minimum retard angle position correspond to minimum limit of the respective controllable ranges of intake- and exhaust-side variable valve mechanisms 4 and 5 and are predetermined as fixed values.

Then, intake- and exhaust-side variable valve mechanisms 4 and 5 are controlled according to the intake- and exhaust-side variable valve target values obtained in section S26, respectively.

Figure 13:
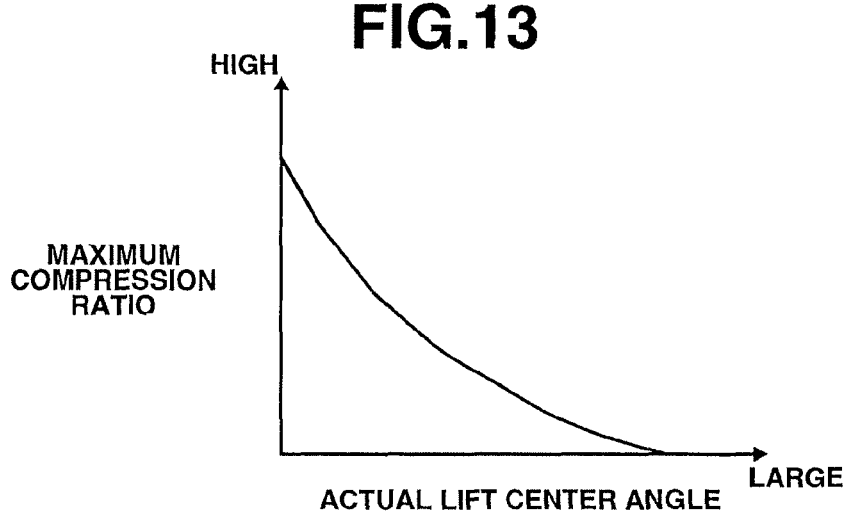
FIG. 13 is a characteristic diagram of a maximum compression ratio as calculated by the control device according to the one embodiment of the present invention.

In section S31, compression ratio interference avoidance calculation is performed to calculate a maximum compression ratio based on the actual lift center angle with reference to a maximum compression ratio calculation map as shown in FIG. 13. In section S31, either one of the actual lift center angles of intake and exhaust valves 2 and 3 where there is a high risk of interference with piston 8 in the vicinity of the piston top dead center is used for the compression ratio interference avoidance calculation.

The maximum compression ratio is the maximum value of the compression ratio at which piston 8 does not interfere with intake and exhaust valves 2 and 3 in the vicinity of the piston top dead center. As mentioned above, the maximum compression ratio is calculated based on either one of the actual lift center angles of intake and exhaust valves 2 and 3 where there is a high risk of interference with piston 8 in the vicinity of the piston top dead center. In the maximum compression ratio calculation map, the maximum compression ratio is set to a higher value as the actual lift center angle of intake valve 2 or exhaust valve 3 (the amount of advance of intake valve 2 relative to the most retard angle position or the amount of retard of exhaust valve 3 relative to its most advance angle position) becomes larger.

In section S32, steady-state compression ratio calculation is performed to calculate a steady-state target compression ratio based on the filling efficiency (actual intake air amount) and the engine rotation speed.

Figure 14:
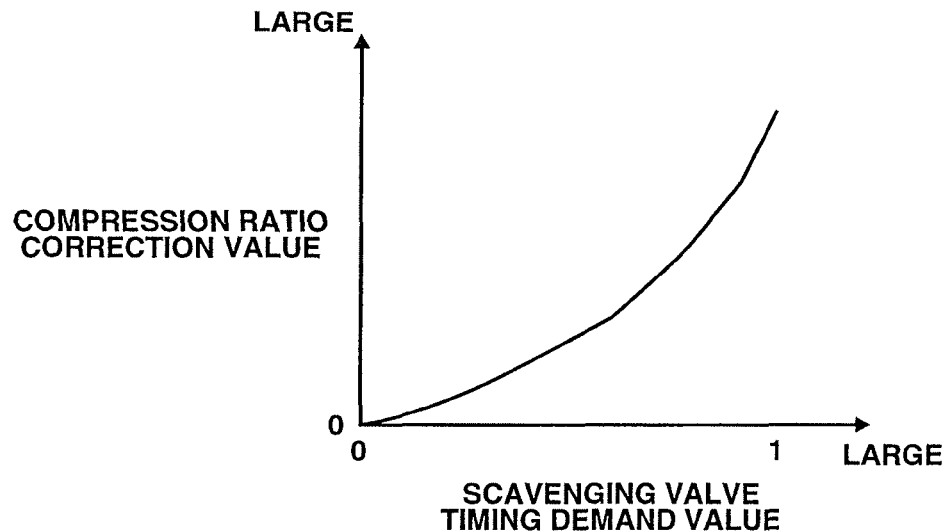
FIG. 14 is a characteristic diagram of a compression ratio correction value as calculated by the control device according to the one embodiment of the present invention.

In section S33, compression ratio correction value calculation is performed to calculate a compression ratio correction value based on the scavenging valve timing demand value with reference to a compression ratio correction value calculation map as shown in FIG. 14. In the compression ratio correction value calculation map, the compression ratio correction value is set so as to increase with increase in the scavenging valve timing demand value.

In section S34, the target compression ratio is obtained as the variable compression ratio target value by subtracting the compression ratio correction value calculated in section S33 from the steady-state target compression ratio calculated in section S32.

In section S35, the maximum compression ratio calculated in section S31 is compared with the target compression ratio obtained in section S34 so as to select the smaller one of these parameters as the variable compression ratio target value. Namely, maximum limit control is performed in section S35 in such a manner that the target variable compression ratio value becomes smaller than its maximum value (control limit value) at which intake and exhaust valves 2 and 3 do not interfere with piston 8 in the vicinity of the piston top dead center.

In section S36, a minimum compression ratio is compared with the variable compression ratio target value obtained in section S35 so as to select the larger one of these parameters as the variable compression ratio target value. Namely, minimum limit control is performed to set a minimum limit on the variable compression ratio target value in section S36. It is herein noted that the minimum compression ratio corresponds to a minimum limit of the controllable range of variable compression ratio mechanism 9 and is predetermined as a fixed value.

Then, variable compression ratio mechanism 9 is controlled according to the variable compression ratio target value obtained in section S36.

In the present embodiment, both of the accelerator opening (APO) and the accelerator opening change rate (ΔAPO) are increased when the accelerator pedal is depressed in the low engine-rotation-speed state. The scavenging valve timing demand value determined in section S14 of FIG. 7 becomes larger (closer to 1) with increase in the accelerator opening (APO) and accelerator opening change rate (ΔAPO). The compression ratio correction value calculated in section S33 of FIG. 10 is increased with increase in the scavenging valve timing demand value so that the decreasing correction of the actual compression ratio is substantially initiated.

When the accelerator opening change rate ΔAPO becomes zero or when the engine rotation speed becomes higher than or equal to a given rotation speed, the scavenging valve timing demand value is decreased to zero. In consequence, the compression ratio correction value calculated in section S33 of FIG. 10 is decreased to zero so that the decreasing correction of the actual compression ratio is substantially finished.

Accordingly, the actual compression ratio can be temporality decreased to be lower than the steady-state target compression ratio at the time when the actual intake air amount should be increased by increasing the valve overlap period of intake and exhaust valves 2 and 3 and enhancing cylinder scavenging. This makes it possible to increase the valve overlap period by increasing the valve overlap period while lowering the piston top dead center position so as not to cause interference between piston 8 and intake and exhaust valves 2 and 3.

In other words, the steady-state target compression ratio is decreased with increase in the valve overlap period when the actual intake air amount is increased even temporarily. The valve overlap period can be thus increased, without causing interference between piston 8 and intake and exhaust valves 2 and 3, even in the case where the demand load is increased from the state where the actual intake air amount is small.

Further, the temporary decrease of the actual compression ratio to a lower level than the steady-state target compression ratio takes place simultaneously with the increase of the valve overlap period of intake and exhaust valves 2 and 3 when the scavenging valve timing demand value becomes larger (closer to 1). This makes it possible to, at the time when the actual intake air amount should be increased by increasing the valve overlap period of intake and exhaust valves 2 and 3, rapidly increase the actual intake air amount.

Figure 15:
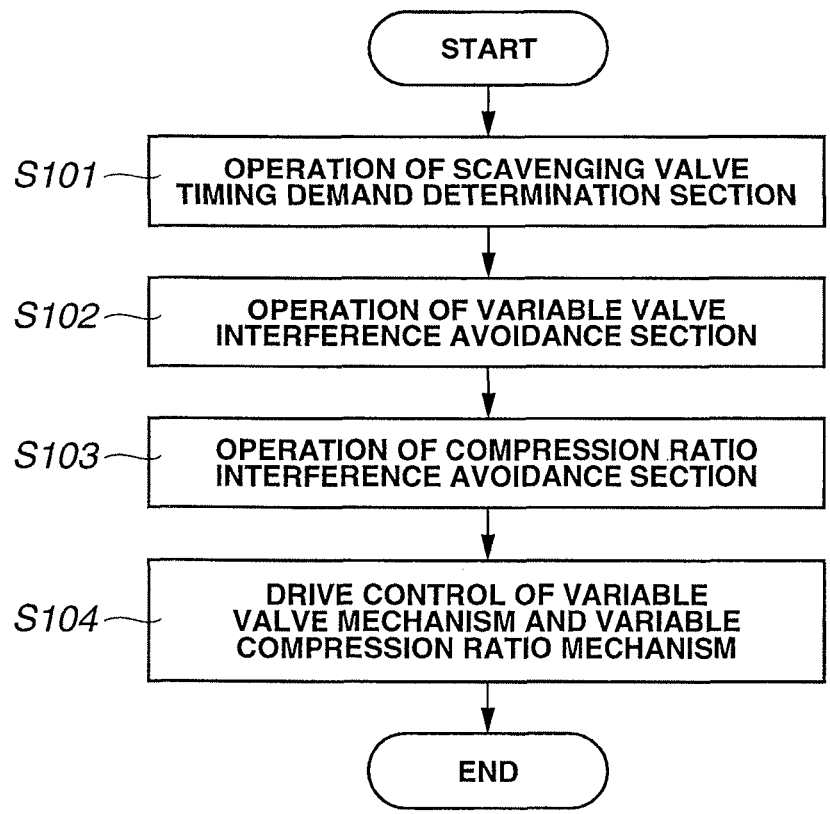
FIG. 15 is a flowchart for the control of the control device according to the one embodiment of the present invention.

FIG. 15 is a flowchart for the above-mentioned control of the present embodiment. At step S101, the scavenging valve timing demand determination unit determines the scavenging valve timing demand value based on the rotation speed of internal combustion engine 1 and the accelerator opening (APO) corresponding to the demand load. At step S102, the variable valve interference avoidance unit sets the target lift center angles as the variable valve target values for intake- and exhaust-side variable valve mechanisms 4 and 5 based on the engine rotation speed, the actual compression ratio and the scavenging valve timing demand value. At step S103, the compression ratio interference avoidance unit sets the target compression ratio as the variable compression ratio target value for variable compression ratio mechanism 9 based on the engine rotation speed, the actual lift center angles of intake and exhaust valves 2 and 3 and the scavenging valve timing demand value. At step S104, intake- and exhaust-side variable valve mechanisms 4 and 5 are controlled according to the variable valve target values set at step S102; and variable compression ratio mechanism 9 is controlled according to the variable compression ratio target value set at step S103.

The invention claimed is:

1. A control device for an internal combustion engine, comprising:
    a variable compression ratio mechanism that varies an actual compression ratio of the internal combustion engine by changing a top dead center position of a piston reciprocating in a cylinder;
    a variable valve mechanism that varies a valve overlap period of intake and exhaust valves by changing an actual valve timing of at least one of the intake and exhaust valves;
    a target compression ratio setting portion that sets a steady-state target compression ratio as a target value of the actual compression ratio during a steady state such that the target compression ratio becomes lower with increase in actual intake air amount;
    a variable valve control portion that controls the variable valve mechanism within a range that avoids interference between the piston and the intake and exhaust valves;
    a scavenging demand value determination portion that determines a scavenging demand value indicating a degree of demand for increasing the actual intake air amount by increase of the valve overlap period;
    a compression ratio correction portion that, at the time when the actual intake air amount should be increased by increase of the valve overlap period, sets a corrected target compression ratio by correcting the steady-state target compression ratio by the scavenging demand value, and then, controls the variable compression ratio mechanism to lower the to dead center position of the piston and thereby vary the actual compression ratio according to the corrected target compression ratio so that the actual compression ratio varied by the variable compression ratio mechanism becomes lower than the steady-state target compression ratio.

2. The control device for the internal combustion engine according to claim 1, wherein the compression ratio correction portion controls the variable compression ratio mechanism such that the actual compression ratio varied by the variable compression ratio mechanism temporarily becomes lower than the steady-state target compression ratio.

3. The control device for the internal combustion engine according to claim 1, further comprising:
    a target valve timing setting portion that sets steady-state target valve timings of the intake and exhaust valves according to demand load; and
    a valve timing correction portion that corrects the target valve timings such that the valve overlap period becomes larger during correction control of the actual compression ratio by the compression ratio correction portion than during the steady state.

4. The control device for the internal combustion engine according to claim 3,
    wherein the compression ratio correction portion sets the corrected target compression ratio such that an amount of decrease of the actual compression ratio becomes larger with increase in the scavenging demand value; and
    wherein the valve timing correction portion corrects the target valve timing such that an amount of increase of the valve overlap period becomes larger with increase in the scavenging demand value.

5. The control device for the internal combustion engine according to claim 4, wherein the scavenging demand value determination portion determines the scavenging demand value based on an accelerator opening such that the scavenging demand value becomes increased with increase in the accelerator opening.

6. The control device for the internal combustion engine according to claim 4, wherein the scavenging demand value determination portion determines the scavenging demand value based on an accelerator opening change rate such that the scavenging demand value becomes increased with increase in the accelerator opening change rate.

7. The control device for the internal combustion engine according to claim 4, wherein the scavenging demand value determination portion determines the scavenging demand value based on an engine rotation speed of the internal combustion engine such that the scavenging demand value becomes increased with increase in the engine rotation speed.

8. A control method for an internal combustion engine, the internal combustion engine comprising: a variable compression ratio mechanism that varies an actual compression ratio of the internal combustion engine by changing a top dead center position of a piston reciprocating in a cylinder; a variable valve mechanism that varies a valve overlap period of intake and exhaust valves by changing an actual valve timing of at least one of the intake and exhaust valves; and a variable valve control portion that controls the variable valve mechanism within a range that avoids interference between the piston and the intake and exhaust valves, the control method comprising:

setting a steady-state target compression ratio as a target value of the actual compression ratio during a steady state such that the target compression ratio becomes lower with increase in actual intake air amount;

determining a scavenging demand value indicating a degree of demand for increasing the actual intake air amount by increase of the valve overlap period;

setting a corrected target compression ratio by correcting the steady-state target compression ratio by the scavenging demand value; and at the time when the actual intake air amount should be increased by increasing the valve overlap period, correcting the steady-state target compression ratio by the scavenging demand value to set a corrected target compression ratio, and then, controlling the variable compression ratio mechanism to lower the top dead center position of the piston and thereby vary the actual compression ratio according to the corrected target compression ratio so that the actual compression ratio varied by the variable compression ratio mechanism becomes lower than the steady-state target compression ratio.

* * * * *